(12) United States Patent
Wang et al.

(10) Patent No.: US 9,046,612 B2
(45) Date of Patent: Jun. 2, 2015

(54) DOUBLE HELIX BORON-10 POWDER THERMAL NEUTRON DETECTOR

(71) Applicant: Los Alamos National Security, LLC, Los Alamos, NM (US)

(72) Inventors: Zhehui Wang, Los Alamos, NM (US); Christopher L. Morris, Los Alamos, NM (US); Jeffrey D. Bacon, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 188 days.

(21) Appl. No.: 13/796,597

(22) Filed: Mar. 12, 2013

(65) Prior Publication Data
US 2014/0158896 A1    Jun. 12, 2014

Related U.S. Application Data

(60) Provisional application No. 61/734,343, filed on Dec. 6, 2012.

(51) Int. Cl.
    *G01T 3/00*    (2006.01)
(52) U.S. Cl.
    CPC ...................... *G01T 3/008* (2013.01)
(58) Field of Classification Search
    CPC ........................................ G01T 3/008
    USPC ......................... 250/390.01, 385.1
    See application file for complete search history.

(56) References Cited

U.S. PATENT DOCUMENTS

| | | | |
|---|---|---|---|
| 3,656,019 A | | 4/1972 | Stowe |
| 3,743,840 A | * | 7/1973 | Thiessen et al. ............ 250/336.1 |
| 3,984,691 A | | 10/1976 | Allemand et al. |
| 7,439,519 B2 | * | 10/2008 | Feller et al. ............... 250/390.01 |
| 8,445,859 B2 | * | 5/2013 | Wang et al. ............... 250/390.01 |
| 2010/0314549 A1 | | 12/2010 | Wang et al. |
| 2011/0068275 A1 | | 3/2011 | McCormick |
| 2013/0067741 A1 | * | 3/2013 | Stephan et al. ................. 29/846 |
| 2014/0061490 A1 | * | 3/2014 | Zhao et al. ............... 250/390.01 |

FOREIGN PATENT DOCUMENTS

WO    2012152558    11/2012

OTHER PUBLICATIONS

International Search Report, International Searching Authority, pp. 1-9, Nov. 12, 2014.

* cited by examiner

*Primary Examiner* — David Porta
*Assistant Examiner* — Mindy Vu
(74) *Attorney, Agent, or Firm* — Samuel M. Freund; Cochran Freund & Young LLC

(57) ABSTRACT

A double-helix Boron-10 powder detector having intrinsic thermal neutron detection efficiency comparable to 36" long, 2-in diameter, 2-bar Helium-3 detectors, and which can be used to replace such detectors for use in portal monitoring, is described. An embodiment of the detector includes a metallic plate coated with Boron-10 powder for generating alpha and Lithium-7 particles responsive to neutrons impinging thereon supported by insulators affixed to at least two opposing edges; a grounded first wire wound in a helical manner around two opposing insulators; and a second wire having a smaller diameter than that of the first wire, wound in a helical manner around the same insulators and spaced apart from the first wire, the second wire being positively biased. A gas, disposed within a gas-tight container enclosing the plate, insulators and wires, and capable of stopping alpha and Lithium-7 particles and generating electrons produces a signal on the second wire which is detected and subsequently related to the number of neutrons impinging on the plate.

19 Claims, 2 Drawing Sheets

DOUBLE HELIX BORON-10 POWDER THERMAL NEUTRON DETECTOR

CROSS-REFERENCE TO RELATED APPLICATIONS

The present application claims the benefit of U.S. Provisional Patent Application No. 61/734,343 for "Double Helix Boron-10 Powder Neutron Detector" by Zhehui Wang et al., which was filed on Dec. 6, 2012, the entire content of which is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to neutron detectors and, more particularly, to Boron-10 powder thermal neutron detectors.

BACKGROUND OF THE INVENTION

Neutron detectors are deployed at ports of entry across the world to monitor people and cargos for smuggled nuclear materials, and are often incorporated in nuclear power plant design to monitor power levels and ensure safe operations. Low-energy neutrons are typically detected indirectly through absorption reactions using materials having high cross sections for absorption of neutrons followed by emission of high energy ionized particles which can be detected by a number of procedures. Helium-3 ($^3$He(n,p)$^3$H) is an important component in neutron radiation detectors; however, the supply of Helium-3 is rapidly dwindling for neutron detection.

SUMMARY OF THE INVENTION

Embodiments of the present invention overcome the disadvantages and limitations of the prior art by providing a thermal neutron detector capable of replacing Helium-3 neutron detectors.

Another object of embodiments of the present invention is to provide a thermal neutron detector comparable in detection efficiency to Helium-3 neutron detectors.

Yet another object of embodiments of the invention is to provide a thermal neutron detector having gamma/neutron discrimination.

Still another object of embodiments of the present invention is to provide a thermal neutron detector adapted to being installed in enclosures for portal monitoring Helium-3 detectors.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, an embodiment of the apparatus for detecting thermal neutrons hereof includes: a first electrically non-conducting elongated bar having a first long side with a first channel formed along the length thereof, and a second long side opposite the first long side; a second electrically non-conducting bar spaced apart from the first bar having a first long side with a second channel formed along the length thereof opposing the first channel, and a second long side opposite the first long side; a flat metallic plate coated with Boron-10 powder on both sides thereof responsive to neutrons, for generating alpha and Lithium-7 particles, adapted to fit into the first channel and the second channel, forming a particle generation unit; a first electrically conducting wire having a first diameter helically wound between the second side of said first bar and the second side of said second bar; a second electrically conducting wire having a second diameter smaller than the first diameter, helically wound between the second side of the first bar and the second side of the second bar in a non-intersecting manner with said first wire, forming a first particle detection unit; a gas-tight, electrically conducting chamber surrounding the particle detection unit; a gas disposed within the chamber effective for stopping alpha and Lithium-7 particles and for generating electrons and ions; a high-voltage power supply for electrically positively biasing the second wire, the first wire being electrically grounded to the chamber; and means for receiving and processing an electrical signal from the second wire.

In another aspect of the present invention and in accordance with its objects and purposes, an embodiment of the apparatus for detecting thermal neutrons hereof includes: at least one first electrically non-conducting elongated bar having a first long side with a first channel formed along the length thereof, and a second long side opposite the first long side; at least one second electrically non-conducting bar spaced apart from the first bar having a first long side with a second channel formed along the length thereof opposing the first groove, and a second long side opposite the first long side; at least one first flat metallic plate coated with Boron-10 powder on both sides thereof responsive to neutrons, for generating alpha and Lithium-7 particles, adapted to fit into the first channel and the second channel, forming at least one first particle generating unit; at least one first electrically conducting wire having a first diameter helically wound between the second side of the at least one first bar and the second side of the at least one second bar; at least one second electrically conducting wire having a second diameter smaller than the first diameter helically wound between the second side of the at least one first bar and the second side of the at least one second bar in a non-intersecting manner with the first wire, forming at least one first particle detection unit; at least one third electrically non-conducting elongated bars having a first long side with a first channel formed along the length thereof, and a second long side opposite the first long side; at least one fourth electrically non-conducting bar spaced apart from said at least one third bar having a first long side with a second channel formed along the length thereof opposing the first channel, and a second long side opposite the first long side; at least one second flat metallic plate coextensive with the at least one first metallic plate coated with Boron-10 powder on one side thereof responsive to neutrons, for generating alpha and Lithium-7 particles, adapted to fit into the first channel of the at least one third bar and the second channel of the at least one fourth bar, forming at least one second particle generating unit; wherein a first of the at least one second particle generating units is placed alongside the at least one first particle detection unit, whereby the coated side of a first of the at least one second metallic plate is parallel to and facing the at least one first metallic plate, forming a second particle detection unit; a gas-tight, electrically conducting chamber surrounding the second particle detection unit; a gas disposed within the chamber effective for stopping alpha and Lithium-7 particles and for generating electrons and ions; a high-voltage power supply for electrically positively biasing the at least one second wire, the at least one first wire being electrically grounded to the chamber; and means for receiving and processing an electrical signal from the second wire.

Benefits and advantages of embodiments of the present invention include, but are not limited to, providing an apparatus for thermal neutron detection having significant gamma/neutron discrimination, and comparable in detection efficiency to Helium-3 neutron detectors.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

Figure 1A:
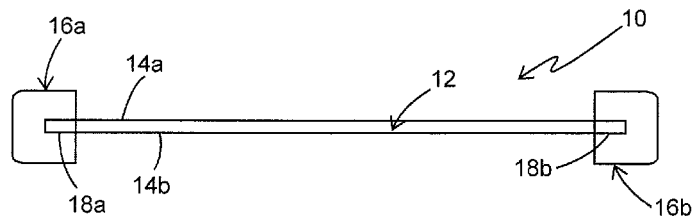
FIG. 1A is a schematic representation of a side view of the alpha and Lithium-7 particle generating unit of an embodiment of the present invention illustrating two spaced-apart, electrical insulators having opposing grooves into which a flat, conducting metal plate having a coating on at least one side is inserted.

Briefly, embodiments of the present invention include a thermal neutron detector using finely-divided (micron- and sub-micron-size) Boron-10 powder ($^{10}B(n,\alpha)^7Li$) to achieve detection efficiencies comparable to Helium-3 based detectors. Boron-10 exhibits excellent gamma/neutron discrimination, permitting ready differentiation between radiation emitted by nuclear materials and naturally occurring gamma radiation emitted by benign cargos, such as bananas. Boron-10 can easily be separated from natural elemental Boron (20% $^{10}B$, 80% $^{11}B$) of which there is a vast natural supply. Unlike Boron trifluoride, which has been suggested as a Helium-3 replacement gas, elemental Boron-10 is a non-toxic solid posing no environmental dangers.

The intrinsic efficiency of Boron-10 neutron detectors is less than one-half of the efficiency of a commercial 2-bar Helium-3 neutron detector for portal monitoring. One way in which to achieve approximate parity between Boron-10 detectors and Helium-3 detectors would be to provide a large detection surface area for the Boron-10 by employing a multilayer detector configuration. For example, with a Boron-10 surface area of about 2 $m^2$, the overall detector efficiency (neutron count rate) is similar to that for commercial Helium-3 detectors. However, in order to accommodate such a large surface area in a neutron moderator housing having dimensions 2.38"×9.88"×36", the standard size for a portal neutron monitoring apparatus and into which 2 Helium-3 neutron detectors are generally installed, neighboring boron plates each having a coating thickness of about 3 µm of Boron-10 would be about 3 mm (less than ⅛"). Anodes might be constructed from solid aluminum plates, or more expensive Zirconium plates, which would have a lower neutron absorption and freedom from alpha particle contamination, having thicknesses of about ⅛" as well. However, the total capacitance of such a multilayer configuration would be several Nano Farads, which is too large for adequate pre-amplification. Suitable noise levels can be obtained with detector capacitances up to a few hundred Pico Farads using commercial preamplifiers or custom-designed field effect transistor-based preamplifiers.

As will be described in more detail hereinbelow, an embodiment of the Boron-10 thermal neutron detector hereof includes a metallic plate coated with Boron-10 powder on at least one side thereof, for generating alpha and Lithium-7 particles responsive to neutrons impinging thereon, supported by insulators affixed to two opposing edges; a grounded first wire wound in a helical manner around the insulators; and a second wire having a diameter smaller than the diameter of the first wire, wound in a helical manner around the same insulators and spaced apart from the first wire, the second wire being positively biased. This design provides a substantial reduction in detector capacitance since the plates do not participate directly in the signal measurement. A gas, disposed within a gas-tight container enclosing the plate, insulators and wires, and capable of stopping alpha and Lithium-7 particles and generating electrons produces a signal on the second wire which is detected and related to the number of neutrons impinging on the plate.

Detectors prepared by a dry spraying process using a commercial electrostatic powder gun have been found to be non-uniform in thickness, including areas of agglomeration of powder and low density of powder, and to have poor powder adhesion. However, as will be described in more detail hereinbelow, in accordance with the teachings of certain embodiments of the present invention, wet spray painting/coating with atomization or nebulization of a liquid suspension has been found to achieve much greater film uniformity and powder density (through adjustment of the compressed air pressure).

Although embodiments of the present double helix boron powder detector can be extended to other sizes and substrates, the detector described hereinbelow is suitable for replacing 36" long, 2-in diameter, 2-bar Helium-3 detectors used in portal monitoring since the outside dimensions of the Boron-10 detector will fit inside of a standard TSA high-density polyethylene moderator box.

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto. Turning now to FIG. 1A, shown is a schematic representation of a side view of the alpha and Lithium-7 particle generating unit, 10, of an embodiment of the present invention illustrating flat conducting metal plate, 12, having Boron-10 coating, 14a, 14b, on at least one side thereof onto two opposing sides of which are affixed electrical insulators, 16a, 16b, having grooves, 18a, 18b, adapted for receiving plate 12, are affixed.

Figure 1B:
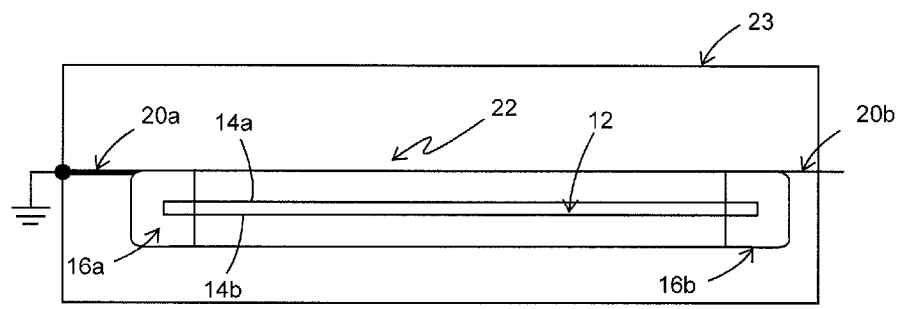
FIG. 1B is a schematic representation of a side view of the particle generating unit shown in FIG. 1A hereof, illustrating electrically conducting wires helically wrapped around the spaced-apart insulators and metal plate coated on both surfaces, forming thereby a detection unit.

FIG. 1B is a schematic representation of a side view of the particle generating unit 10 shown in FIG. 1A hereof, illustrating non-intersecting electrically conducting wires, 20a, 20b, helically wrapped around insulators 16a, 16b and metal plate 12 coated on both surfaces 14a, 14b forming thereby detection unit, 22. Wire 20a has a larger diameter than wire 20b, and neither wire is in electrical contact with plate 12. Wire 20a is connected to grounded electrically conducting, gas-tight chamber, 23, which surrounds detection unit 22.

Figure 1C:
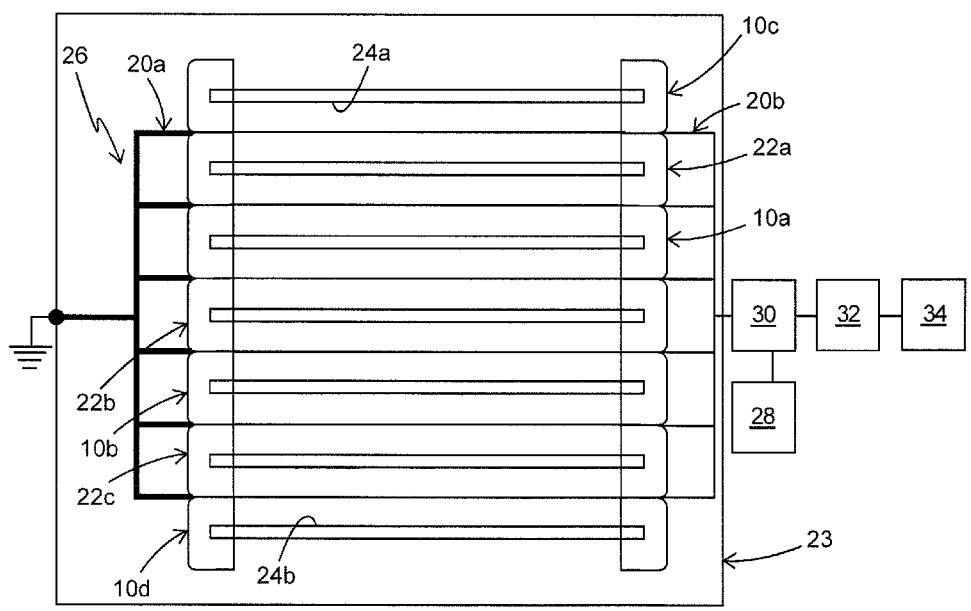
FIG. 1C is a schematic representation of a side view of a stack of three detection units having particle generating units with metal plates coated on both sides therebetween, and one single-side Boron-10 coated particle generating unit on each end of the stack with the coated sides facing inwardly, adjacent to a detection unit, forming thereby an embodiment of the present thermal neutron detector.

FIG. 1C is a schematic representation of a side view of a stack of three detection units, 22a-22c, having particle generating units, 10a, and 10b, having metal plates coated on both sides therebetween, and one single-side Boron-10 coated particle generating unit, 10c, and 10d, on each end of the stack with the coated sides facing inwardly, 24a, 24b, adjacent to a detection unit, and surrounded by gas-tight, electrically conducting chamber 23, forming thereby embodiment, 26, of the present thermal neutron detector. Wires 20a are electrically connected in parallel and are grounded through electrically conducting chamber 23, while wires 20b are electrically connected in parallel and biased positive using voltage source, 28, through preamplifier, 30, which also receives signals from wires 20b, as will be explained in more detail hereinbelow. The output from preamplifier 30 is directed to Field-Programmable Gate Array/Flash ADC (FPGA/FADC), 32, and stored and processed by computer, 34. As stated, preamplifier 30 serves the dual functions of supplying positive high voltage bias from voltage supply 28 to wires 20b, and amplifying and transmitting the signal thereon to FPGA/FADC 32, which is directed to computer 34. Clearly, other apparatus for measuring the signals on wires 20b may be contemplated.

Figure 2:
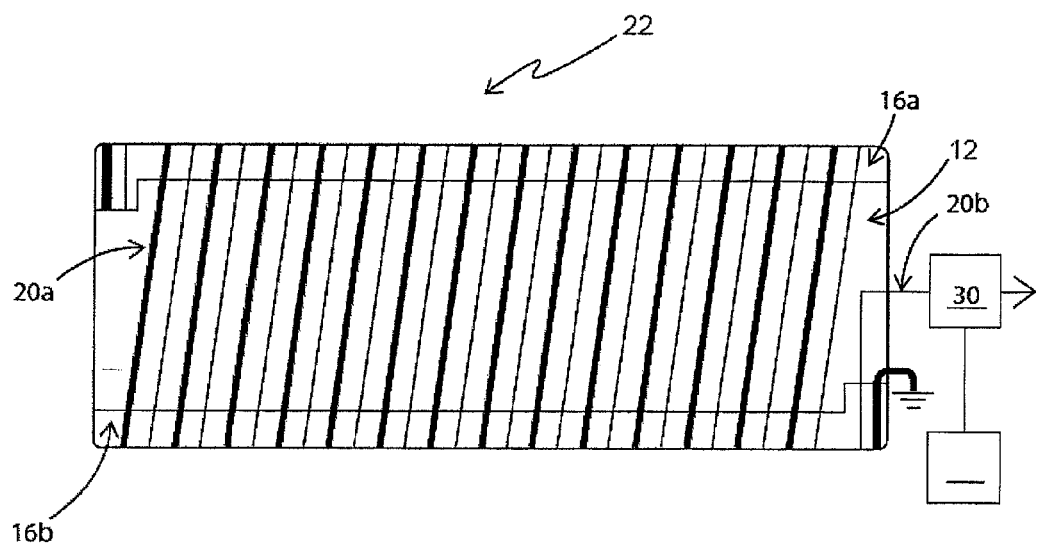
FIG. 2 is a schematic representation of a top view of a detection unit shown in FIG. 1B hereof, illustrating a thick electrically conducting wire helically wound about a particle generating unit, and a thin electrically conducting wire helically wound about the particle generating unit and spaced-apart from the thick wire.

FIG. 2 is a schematic representation of a top view of a detection unit 22 shown in FIG. 1B hereof, illustrating the two helically wound and spaced-apart wires 20a and 20b.

Metallic plates 12 may be about 0.1" thick (other thicknesses may be used as long as the plates have structural rigidity) and fabricated from aluminum or zirconium, as examples. Insulators 16a and 16b may be fabricated from acrylic or other plastic material, as examples, and may be about 0.225" thick (again, other thicknesses may be used as long as the resulting insulators have structural rigidity). Wires 20a form a guard wire array and may be about 0.007" diameter Be Copper alloy at a nominal tension of about 250 g. Wires 20b may be about 0.0008" diameter Au-coated tungsten at a nominal tension of about 40 g, and form the anode biased at between about +2 kV and approximately +2.5 kV. The wires are terminated at both ends by soldering onto two end tabs.

In use, neutron detector 26 is surrounded by a gas-tight enclosure or chamber 23 filled with a detector gas having large collision cross section for alpha particles and Lithium-7 particles, such as $CF_4$, as an example. Neutrons impinging on the Boron-10 surfaces generate alpha and Lithium-7 particles which are stopped by the $CF_4$ producing electrons which are collected on positively biased wires 20b and detected and analyzed using preamplifier 30, FPGA/FADC (field-programmable gate array/flash analog-to-digital converter) 32, and computer 34 for processing the output from the FPGA/FADC.

Figure 3:
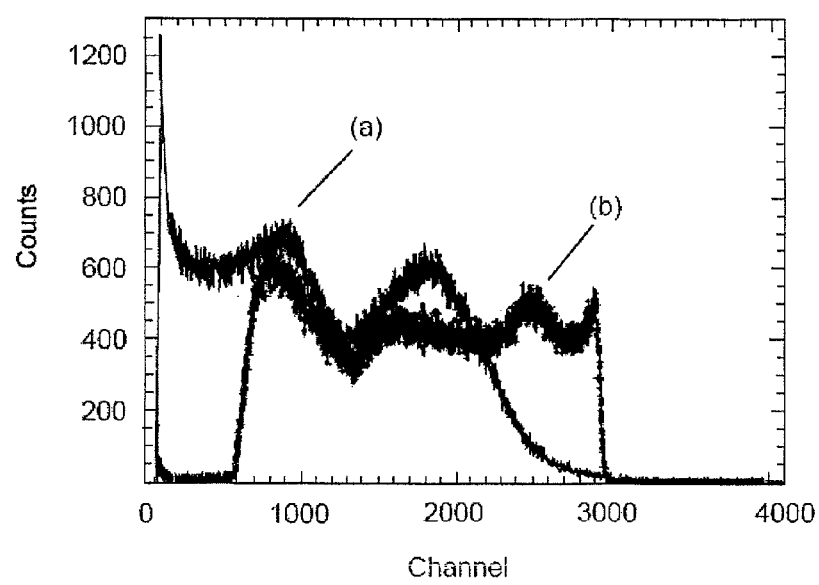
FIG. 3 is a graph illustrating that the measured Boron-10 thermal neutron detector efficiency for neutrons from an AmBe neutron source using the apparatus shown in FIG. 1C (curve (a)) is about 120% of the efficiency of a single 2-bar Helium-3 neutron detector (curve (b)).

FIG. 3 is a graph illustrating that the measured Boron-10 thermal neutron detector efficiency for neutrons from an AmBe neutron source using the apparatus shown in FIG. 1C (curve (a)) is about 120% of the efficiency of a single 2-bar Helium-3 neutron detector (curve (b)).

Having generally described the present invention, the following EXAMPLE provides additional details.

EXAMPLE

As stated hereinabove, a wet spray painting process has been found to achieve better film uniformity and powder density than the electrostatic powder spraying of the metallic substrates. An advantage of wet spraying is that powder adhesion can be adjusted by introducing small amounts of adhesives such as super glue or other commercial equivalent, soluble polymers or equivalents that can bind to boron powder, into the solvent. Control of film thickness has been achieved by adjustment of the spraying time, the distance of the spray nozzle from the substrate, the nozzle size, and the pressure of the compressed propellant. Natural Boron powder was mixed with acetone at solid to liquid ratios between about 10% and approximately 60%, forming colloidal suspensions since the Boron is insoluble in the liquids employed Ethanol and water were also used. Ratios between 20% and 30% were found to give the best results for controlling film thickness. Higher powder concentrations resulted in coatings that were too thick, while more dilute solutions require many spray cycles which requires higher solvent costs because the films are cured by evaporation. The film thicknesses were determined by weighing the substrate before and after the spray coating process once the solvent has completely evaporated. Removal of solvent by evaporation is very slow unless the coated sample is heated. A repetitive spray process with intermediate weighing of the substrate was employed to achieve an approximately 3 µm coating. Approximately 100 mg of Boron powder was used for a 4"×6" area. A similar process was used for coating Boron-10 powder.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for detecting thermal neutrons comprising: a first electrically non-conducting elongated bar having a first long side with a first channel formed along the length thereof, and a second long side opposite the first long side; a second electrically non-conducting bar spaced apart from said first bar having a first long side with a second channel formed along the length thereof opposing the first channel, and a second long side opposite the first long side; a flat metallic plate coated with Boron-10 powder on both sides thereof responsive to neutrons, for generating alpha and Lithium-7 particles, adapted to fit into the first channel and the second channel, forming a particle generation unit; a first electrically conducting wire having a first diameter helically wound between the second side of said first bar and the second side of said second bar; a second electrically conducting wire having a second diameter smaller than the first diameter, helically wound between the second side of said first bar and the second side of said second bar in a non-intersecting manner with said first wire, forming a first particle detection unit; a gas-tight, electrically conducting chamber surrounding said particle detection unit; a gas disposed within said chamber effective for stopping alpha and Lithium-7 particles and for generating electrons and ions; a high-voltage power supply for electrically positively biasing said second wire, said first wire being electrically grounded to said chamber; and means for receiving and processing an electrical signal from said second wire.

2. The apparatus for detecting thermal neutrons of claim 1, further comprising a third electrically non-conducting elongated bar having a first long side with a first channel formed along the length thereof, and a second long side opposite the first long side; a fourth electrically non-conducting bar spaced apart from said third bar having a first long side with a second channel formed along the length thereof opposing the first channel, and a second long side opposite the first long side; a second flat metallic plate coextensive with said first metallic plate coated with Boron-10 powder on one side thereof responsive to neutrons, for generating alpha and Lithium-7 particles, adapted to fit into the first channel of said third bar and the second channel of said fourth bar, forming a second particle generating unit; wherein said second particle detection unit is placed alongside said first particle detection unit, whereby the coated side of said second metallic plate is parallel to and facing said first metallic plate, forming a second particle detection unit, said second particle detection unit being enclosed by said chamber.

3. The apparatus for detecting thermal neutrons of claim 2 further comprising a fifth electrically non-conducting elongated bar having a first long side with a first channel formed along the length thereof, and a second long side opposite the first long side; a sixth electrically non-conducting bar spaced apart from said third bar having a first long side with a second channel formed along the length thereof opposing the first channel, and a second long side opposite the first long side; a third flat metallic plate coextensive with said a first metallic plate coated with Boron-10 powder on one side thereof responsive to neutrons, for generating alpha and Lithium-7 particles, adapted to fit into the first channel of said fifth bar and the second channel of said sixth bar, forming a third particle generating unit; wherein said third particle generating unit is placed alongside said first particle detection unit on the opposite side thereof from said second particle generating unit, whereby the coated side of said third metallic plate is parallel to and facing said first metallic plate, forming a third particle detection unit, said third particle detection unit being enclosed by said chamber.

4. The apparatus for detecting thermal neutrons of claim 1, wherein said metallic plate is chosen from aluminum and zirconium.

5. The apparatus for detecting thermal neutrons of claim 1, wherein said non-conducting elongated bars comprise plastic material.

6. The apparatus for detecting thermal neutrons of claim 1, wherein said detector gas comprises carbon tetrafluoride.

7. The apparatus for detecting thermal neutrons of claim 1, wherein said second wire is positively biased to between about 2 kV and about 2.5 kV.

8. The apparatus for detecting thermal neutrons of claim 1, wherein said means for receiving and processing an electrical signal from said second wire comprises a preamplifier in electrical connection with said second wire; a field-programmable gate array/flash analog-to-digital converter for receiving output from said preamplifier; and a computer for analyzing output from said field-programmable gate array/flash analog-to-digital converter.

9. The apparatus for detecting thermal neutrons of claim 1, wherein said Boron-10 powder is applied to said metallic plate by a wet spray painting process using a slurry comprising Boron-10 powder, at least one adhesive effective for binding to Boron-10 powder, and at least one liquid.

10. The apparatus for detecting thermal neutrons of claim 1, wherein said Boron-10 powder is applied to said metallic plate by a wet spray painting process using a slurry comprising Boron-10 powder, at least one polymer effective for binding to Boron-10 powder, and at least one liquid.

11. Apparatus for detecting thermal neutrons comprising: at least one first electrically non-conducting elongated bar having a first long side with a first channel formed along the length thereof, and a second long side opposite the first long side; at least one second electrically non-conducting bar spaced apart from said first bar having a first long side with a second channel formed along the length thereof opposing the first groove, and a second long side opposite the first long side; at least one first flat metallic plate coated with Boron-10 powder on both sides thereof responsive to neutrons, for generating alpha and Lithium-7 particles, adapted to fit into the first channel and the second channel, forming at least one first particle generating unit; at least one first electrically conducting wire having a first diameter helically wound between the second side of said at least one first bar and the second side of said at least one second bar; at least one second electrically conducting wire having a second diameter smaller than the first diameter helically wound between the second side of said at least one first bar and the second side of said at least one second bar in a non-intersecting manner with said first wire, forming at least one first particle detection unit; at least one third electrically non-conducting elongated bars having a first long side with a first channel formed along the length thereof, and a second long side opposite the first long side; at least one fourth electrically non-conducting bar spaced apart from said at least one third bar having a first long side with a second channel formed along the length thereof opposing the first channel, and a second long side opposite the first long side; at least one second flat metallic plate coextensive with said at least one first metallic plate coated with Boron-10 powder on one side thereof responsive to neutrons, for generating alpha and Lithium-7 particles, adapted to fit into the first channel of said at least one third bar and the second channel of said at least one fourth bar, forming at least one second particle generating unit; wherein a first of said at least one second particle generating units is placed alongside said at least one first particle detection unit, whereby the coated side of a first of said at least one second metallic plate is parallel to and facing said at least one first metallic plate, forming a second particle detection unit; a gas-tight, electrically conducting chamber surrounding said second particle detection unit; a gas disposed within said chamber effective for stopping alpha and Lithium-7 particles and for generating electrons and ions; a high-voltage power supply for electrically positively biasing said at least one second wire, said at least one first wire being electrically grounded to said chamber; and means for receiving and processing an electrical signal from said second wire.

12. The apparatus for detecting thermal neutrons of claim 11, wherein a second of said at least one particle generating units is placed alongside said first particle detection unit on the opposite side thereof from said first of said at least one second particle generating unit, whereby the coated side of a second of said third metallic plates is parallel to and facing said first metallic plate, forming a third particle detection unit, said third particle detection unit being enclosed by said chamber.

13. The apparatus for detecting thermal neutrons of claim 11, wherein said at least one metallic plate is chosen from aluminum and zirconium.

14. The apparatus for detecting thermal neutrons of claim 11, wherein said at least one non-conducting elongated bar comprises plastic material.

15. The apparatus for detecting thermal neutrons of claim 11, wherein said detector gas comprises carbon tetrafluoride.

16. The apparatus for detecting thermal neutrons of claim 11, wherein said at least one second wire is positively biased to between about 2 kV and about 2.5 kV.

17. The apparatus for detecting thermal neutrons of claim 11, wherein said means for receiving and processing an electrical signal from said second wire comprises a preamplifier in electrical connection with said second wire; a field-programmable gate array/flash analog-to-digital converter for receiving output from said preamplifier; and a computer for analyzing output from said field-programmable gate array/flash analog-to-digital converter.

18. The apparatus for detecting thermal neutrons of claim 11, wherein said Boron-10 powder is applied to said metallic plate by a wet spray painting process using a slurry comprising Boron-10 powder, at least one adhesive effective for binding to Boron-10 powder, and at least one liquid.

19. The apparatus for detecting thermal neutrons of claim 11, wherein said Boron-10 powder is applied to said metallic plate by a wet spray painting process using a slurry comprising Boron-10 powder, at least one polymer effective for binding to Boron-10 powder, and at least one liquid.

* * * * *